Dec. 24, 1963    W. ERNST    3,115,203
AIR FLOW PRECISION WEIGHING DEVICE
Filed Jan. 13, 1961
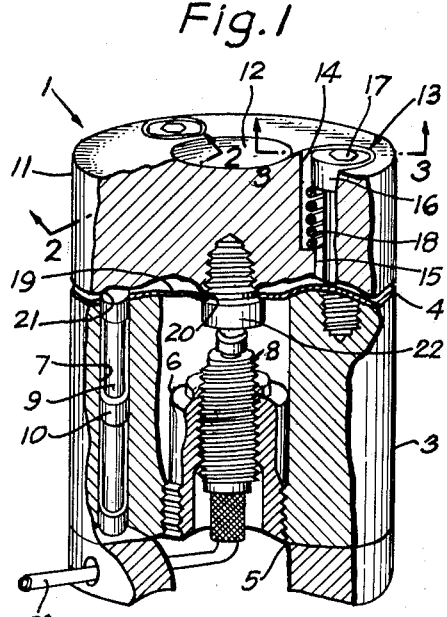
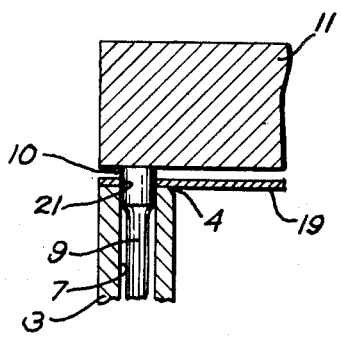
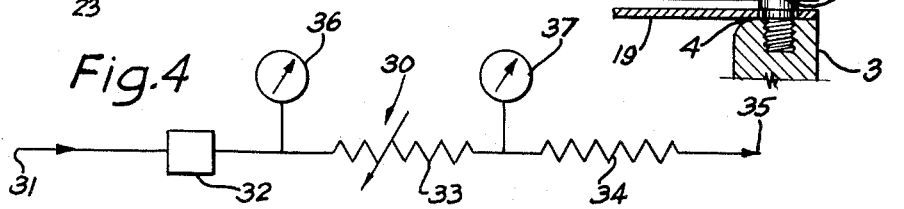
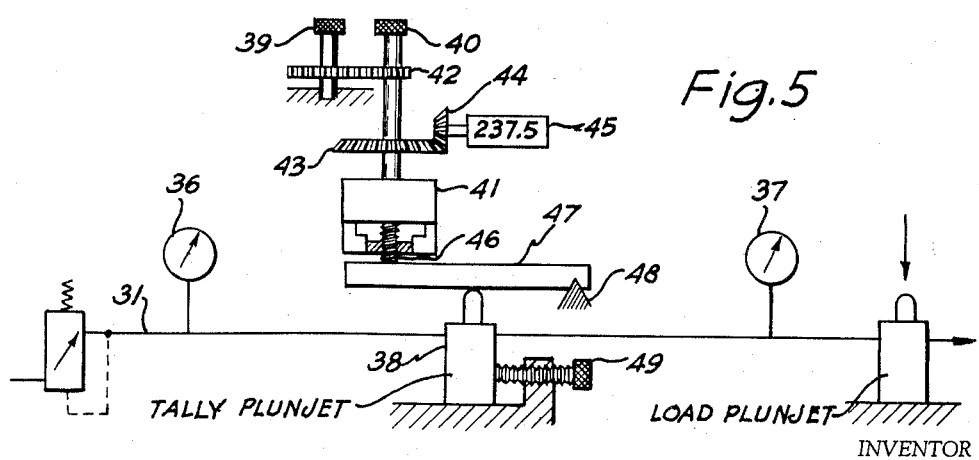
INVENTOR
WALTER ERNST
BY Toulmin & Toulmin
ATTORNEYS

United States Patent Office 3,115,203
Patented Dec. 24, 1963

3,115,203
AIR FLOW PRECISION WEIGHING DEVICE
Walter Ernst, Dayton, Ohio, assignor to The Commonwealth Engineering Company of Ohio, Dayton, Ohio
Filed Jan. 13, 1961, Ser. No. 82,457
7 Claims. (Cl. 177—208)

The present invention relates to an air flow weighing device, more particularly, to a highly accurate weighing device for batch and continuous weighing of large weights wherein the weight is supported upon a simple elastic structure and the deflection of the structure is measured by the modulation of flow through an air discharge orifice.

It is known that the elastic deflection of a stressed member under a given load may be utilized to determine the magnitude of the load. The deflection of the member is proportional to the load and the length of the stressed member, and inversely proportional to its area and the constant known as the modulus of elasticity. Since the modulus of most engineering materials is large, the deflection of the member is very small. Thus, the direct measurement of such small amounts of deflection is difficult, and direct measurements of any fractions thereof is virtually impossible. There is a need for some form of gain or amplification to be able to measure the effect of the loads.

Original developments in the field of weighing were directed towards increasing the gain at the output of the load itself. This led to the development of the spring scale. While spring scales have been built to great accuracy and considerable size, they have several disadvantages. Even with the greatest care in manufacture, it is not possible to insure absolute uniformity and linearity. Also, if any appreciable gain is used on the spring device, the energy that must be absorbed becomes inordinately large.

One apparent solution would be to put the gain into the indicating device, whose power level is low, rather than into the load output. Then the load would be resisted by a low gain device and the indication could be amplified. Before this system could be employed, however, it was necessary to develop high gain indication amplifiers.

In any kind of mechanical device such as an indicator, the amount of gain is limited, and added to this are the drawbacks of any mechanical device, namely, friction, wear and backlash. While the development of electronic amplification seemed to hold great promise, actual performance of electronic amplifying devices was disappointing. Difficulties had been experienced with instability, noise, zero shift, and failure to maintain calibration. Added to this were delicacy and complexity, which made the electronic device unsuited for production operations.

There are two methods for weight determination, direct reading such as, for instance, a spring scale, and a tallying or balancing system such as a weight balance. A direct reading system has certain advantages and is particularly useful for continuous weighing, but its main drawback is the size of indication required for very accurate readout. For example, if a 0.1% readout is required, then the indicating device must have 1,000 divisions and with a minimum of 0.025 inch width per division the total scale length would have to be 25 inches. A tallying or balancing device may be made more compact as it will require only a null indicator and a counting device. Accordingly, there are disclosed herein two approaches for using an air gauge weighing device. One approach is for a direct reading device that can be read out to 0.5% of full scale, and a balancing device that could be read out to 0.1% of full scale or finer.

In order to overcome the above mentioned disadvantages and to provide an accurate and dependable weighing device, it has already been proposed to provide a direct reading device for weighing wherein the flow of air is measured to indicate the weight. Such a direct reading device employs the principle of the constant pressure air flow. It this instance the air flow applied to the weighing capsule is modulated by a variable orifice with pressure being held constant by a regulator. The flow rate is shown by a rotameter and is an indication of the deflection of the load indicator, since the deflection is proportional to the load itself.

This weighing device has a minimum of moving parts and has a complete absence of any friction or mechanical wear. In addition, the time lag of air flow gauges is so small that the response of such a system is almost instantaneous regardless of the dimensions. As a result a weighing device can be constructed which can be used for both batch and continuous weighing.

The balancing air flow device essentially comprises an air flow throttling arrangement having two resistances in series. These resistances comprise carefully matched variable orifices with one being operated by the action of the weight or load to be measured and the other orifice adjusted in a complementary fashion, so that the relationship between the orifice areas remains constant at all loads. In order to determine the load the trim orifice is adjusted until the gauge shows the same reading that it does at zero load. The number of turns required to adjust the trim orifice is tallied on a counter and gives a direct reading of the load.

The weighing capsule is the same as that used in a direct reading air weighing device and will operate as the variable load resistance in the air circuit.

It is therefore the principal object of this invention to provide a novel and improved weighing device.

It is another object of this invention to provide a balancing air flow weighing device.

It is a further object of this invention to provide a compact air weighing device which is accurate in operation and simple to operate.

Additional objects and advantages of this invention will become readily apparent upon reference to the foregoing description and to the following drawings wherein:

FIG. 1 is a perspective view of the weighing capsule with portions thereof out away so as to show the manner in which the variable orifice is mounted;

FIG. 2 is a sectional view taken along the line 4—4 in FIG. 1 and showing the weighing anvil supported upon pins;

FIG. 3 is a sectional view taken along the line 5—5 in FIG. 1 and showing the clamping screw and the spring which apply a preload to the weighing capsule;

FIG. 4 is a schematic view showing the components of the balancing air weighing device; and FIG. 5 is a schematic view of the tally device employed in a weighing device illustrated in FIG. 6.

The present invention essentially comprises a source of clean dry air under constant pressure, a weighing capsule to which the load is applied connected in series with the source of air, and a trim resistance connected between the source of air and the weighing capsule. The trim resistance and the weighing capsule comprise carefully matched variable orifices. The weighing capsule comprises a weighing anvil supported upon an elastically deformable structure mounted on a base. A variable orifice is also mounted in the base so as to coact with the weighing anvil in such a manner that the flow of air discharged from the orifice is modulated by the weighing anvil.

In order that the invention may be fully comprehended a weighing capsule to be used will be first described.

The weighing capsule 1 comprises a base 3 which is cylindrical in shape and has a substantial wall thickness. The upper end of the base, as indicated at 4, is open, and the lower end of the base, indicated at 5, is closed by a plug or sleeve 6. There are a plurality of axial bores 7 opening on the top edge of the base 3.

A prefabricated variable orifice 8, such as is readily obtained in commerce, is threaded into the sleeve 6. This orifice will measure gaps from 0.001 inch (in.) to 0.080 in. and has a very great gain.

A pin 9 of an elastically deformable material is inserted into each one of the bores 7. These pins are accurately ground to diameter and length, and each has a plurality of enlarged portions 10 to maintain the pin in proper position in the bore. The pins in the weighing device of this invention are so ground that at the maximum rating of the weighing device they will compress 0.005 in. The pins extend slightly above the upper edge of the cylinder. Thus, when the weighing anvil to be later described rests upon the top edge of the base, the maximum weight will be reached and the device cannot be overloaded.

By varying the diameter of the pins, the rating of the weighing device may be varied within wide limits.

A weighing anvil 11 having a concave hollow recess 12 in the top surface thereof is supported on the projecting ends of the pins 9. There are a plurality of axial bores 13 spaced on the top surface of the weighing head adjacent the perimeter thereof. Each axial bore 13 passes completely through the weighing head and comprises a large-diameter bore 14 and a smaller-diameter bore 15. Clamping screws 16, each having a head 17 of the Allen type, are received in the bores 13 and have the lower end thereof threaded into tapped openings in the top edge of the cylindrical base. Springs 18 are positioned between the heads of the clamping screw 16 and the bottom of the large-diameter bores 14 so as to urge the weighing head against the pins and to preload the weighing device. This preloading will eliminate lost motion or a "dead" zone, when a load is placed upon the weighing head.

A thin metallic diaphragm 19 covers the upper end 4 of the cylindrical base. The diaphragm has a center opening 20 and a plurality of spaced holes 21 adjacent the periphery thereof. The holes 21 alternately accommodate the pins 9 and the clamping screws 16. The clamping screws 16, as may be seen in FIG. 3, secure the diaphragm to the top edge of the base 3. The pins 9, however, are free to slide in the holes in the diaphragm.

Since it is not always possible to locate the weight precisely in a vertical line with the weighing device, vertical components of this weight are frequently encountered. The diaphragm 19, which has virtually no resistance to vertical deflection, has been provided to absorb such lateral force components without creating friction and introducing inaccuracies.

There is a solid plug 22 which passes through the central opening 20 of the diaphragm 19 and is threadedly received in the bottom face of the weighing head 11. This plug 22 both secures the diaphragm to the weighing head and co-acts with the variable orifice so as to modulate the flow of air discharged from the orifice.

A tube or conduit 23 connects the variable orifice with the source of air.

Proceeding next to FIG. 4 there is indicated generally at 30 the balancing weighing device which essentially comprises a source of clean dry air 31, a pressure regulator 32, a trim resistance 33, a "load resistance" 34, all of which are connected in series. The air is then discharged from the weighing device to the atmosphere at 35. Pressure gauges 36 and 37 are also provided in the air line.

The load resistance 34 comprises a weighing capsule 1 as previously illustrated and described.

The tallying device is schematically shown on FIG. 5 and comprises a tally variable orifice 38 which may be the same as the load variable orifice (capsule 1) previously described. The capsule, such as capsule 1 of FIG. 1, to be employed in element 38 requires that the air discharged thereof is caught and then fed to the load variable orifice. This can simply be carried out in encasing such capsule thus catching all the air escaping from the capsule.

The tally orifice 38 is actuated by a micrometer screw comprising both a rough adjustment 39 and a fine adjustment 40. There is a gear train 41 which is connected to the fine adjustment shaft 42. A bevel gear 43 mounted on the input side of the gear train is connected through a bevel gear 44 to a revolution counter 45. With no load applied to the load variable orifice (load resistance 34), and zero position at the counter, gauge 37 indicates a particular value which is arbitrarily considered "zero" position. Of course, this does not mean zero-pressure, but it is a zero position from the standpoint of balancing. The counter 45 counts the number of revolutions required to re-establish the air relationship of the variable orifices when a load is applied and when the gauge is brought back to the zero position as defined.

The output end 46 of the gear train bears upon a beam 47 which is pivotally mounted at a fulcrum 48 on one end thereof. The beam 47 bears against the variable orifice 38 so as to vary the pressure thereof.

Air pressures are determined by a pressure gauge such as an Emery. In actual practice the gauge 37 is zeroed when the load is zero at an arbitrarily chosen level, as stated.

A precision regulator is used to adjust input pressure until the arbitrary zero point is reached. The scale of operation of the variable orifice 38 can be adjusted by means of the calibration screw 49.

The tally counter 45 has four digits, thus permitting readout within 0.1%. Weighing is accomplished by employing the balance principle. After the weight has been applied, a tallying device is operated by means of the over-driven high speed or rough adjustment knob 39 until the gauge shows near zero position. Fine adjustment is made by direct operation of the input shaft knob until the gauge shows zero. The weight is then read off on the counter.

To further illustrate the operating principle of the balance weighing device of this invention assume that the weighing capsule has the maximum load capacity of five thousand pounds, a deflection of 0.005 inch. Assume that the trim orifice has a deflection of 0.04 in. This will produce a gain of 8:1 between the variable orifices.

If the fine adjustment knob has 100 revolutions for the total range, then with a 40:1 range in the gear train and a standard micrometer screw of 40 threads per inch we will have a movement of the screw of $$\frac{2\frac{1}{2}}{40} = 0.0625 \text{ inch}$$

Thus a leverage of $$\frac{0.0625}{0.0400} = 1.565$$

is required.

The count is geared to the input shaft of the trimmer with a 5:1 ratio to show 500 revolutions for the full range which corresponds to 5,000 pounds weight. Since the counter is arranged to count to the tenth of a revolution, the device may be read out to one pound.

With no load on the weighing capsule and the counter at zero the gauge should show zero on the arbitrarily established point. If it does not the gauge can be zeroed by adjusting the reducing valve. When a load of 5,000 pounds is applied to the capsule and the counter advanced to 500 the gauge should again be zeroed by using the calibration screw.

Thus to operate the balance weighing device of this invention the load is applied to the weighing capsule. The trimmer variable orifice is then adjusted with the rough adjustment knob until the gauge reads approximately zero. Then the fine knob is adjusted for zero gauge reading and the weight is read on the counter. In the example as illustrated the reading should be multiplied by ten.

The accuracy of this balance weighing device depends on the accuracy of its components. The variable orifices as supplied by Sheffield under the trade name "plunjets" are known to be linear as they are being used daily for air gauging at amplifications as great as 20,000:1. The absolute amount of displacement is immaterial as it will be adjusted out by the calibration screw.

An "Emery" precision gauge has an accuracy within 0.1% of its full gauge length. A ground precision micrometer screw would be used with a precision servomotor gear head for adjustment of the trimming variable orifice.

The advantages of the balance weighing device of this invention is that the weighing or load carrying capsule is extremely small and compact for even the heaviest weights. It has no moving parts, there is no friction or binding under any load, and it is rugged and simple in construction. The tallying device is entirely independent of and not physically connected to the weighing device and any friction in the tallying device has no effect on the accuracy. Weighing and tallying devices may be located a reasonable distance apart. Since this weighing device operates on the air flow principle no electric or electronic equipment is required, thus eliminating a source of instability, zero shift and loss of calibration.

The primary uses intended for the balance weighing device of this invention is for batch or standard weighing of very heavy weights to a high degree of accuracy.

Thus it can be seen that the present invention discloses a balance reading unit which utilizes a flow of air to measure vertical loads. The weighing capsule, which is an essential component of both weighing units, is simple in construction, easy to operate, and has a minimum of moving parts so as not to be susceptible to inaccuracy.

It will be understood that this invention is susceptible to modification in order to adapt it to different usages and conditions, and, accordingly, it is desired to comprehend such modifications within this invention as may fall within the scope of the appended claims.

I claim:

1. A weighing device comprising a source of constant air pressure, a first variable orifice adjustable corresponding and in relation to forces applied thereto, a second, similar variable orifice, conduit means for connecting said first and second variable orifices and said source of constant air pressure in series, there being a pressure reference point at the junction of said series-connection of said orifices, a pressure gauge connected to said reference point, means including a lever connected to said first variable orifice for applying an adjustable force to said first orifice so as to throttle said first orifice, and means for measuring the amount of adjustment necessary when said second orifice is subjected to the throttling effect of a load, so as to restore the pressure at said reference point to the value before said load was effective.

2. A weighing device comprising a source of air pressure, a constant pressure regulator connected thereto, a first variable orifice adjustable corresponding and in relation to forces applied thereto, a similar load responsive variable orifice all being connected in series to said regulator, first and second air pressure measuring means, respectively connected between said regulator and said first variable orifice, and said second variable orifice, means including a lever connected to said first variable orifice for applying an adjustable force to said first orifice for throttling thereof, and means for measuring the amount of adjustment necessary when the second orifice is subjected to the throttling effect of a load to restore the pressure at said second pressure measuring means to the value before said load was effective.

3. A weighing device comprising an air pressure source with constant pressure regulator, a first variable orifice adjustable corresponding and in relation to forces applied thereto and being connected to said regulator by air conduit means, a second similar variable orifice, connected in series to said first orifice by further air conduit means, there being a pressure reference point at the junction of said series-connection of said orifices, a pressure gauge connected to said reference point, means connected to said first variable orifices for applying an adjustable force to said first orifice for throttling thereof, and means including a tally counter for measuring the amount of adjustment necessary when the second orifice is subjected to the throttling effect of a load, so as to restore the pressure at said reference point to the value before said load was effective, said tally counter being calibrated to the weight capacity of the second variable orifice so that the load can be directly read on the counter.

4. A weighing device comprising a source of air under pressure with a constant pressure regulator connected thereto, a first variable orifice adjustable corresponding and in relation to forces applied thereto, conduit means for connecting said first orifice to said regulator, a second similar variable orifice, conduit means for connecting said second orifice in series to said first orifice, there being a pressure reference point at the junction of said series-connection of said orifices, a pressure gauge connected to said reference point, means for applying an adjustable force to said first orifice for throttling thereof, means including a gear train for adjusting the degree of opening and throttling of said first variable orifice, means for measuring the movement necessary of said gear train when a load is applied to said second orifice, so as to restore the pressure at said reference point to the value before said load was effective, and means for calibrating at least one of said first and said second orifices.

5. A weighing device comprising a constant pressure air source, a first variable orifice adjustable corresponding and in relation to forces applied thereto, conduit means for connecting said first orifice to said source, a second, similar variable orifice conduit means for connecting said second orifice in series to said first orifice, there being a pressure reference point at the junction of said series-connection of said orifices, a pressure gauge connected to said reference point, means for applying an adjustable force to said first orifice for throttling thereof, means including a gear train for adjusting the amount of opening of said first variable orifice, and a tally counter connected with the input side of said gear train for measuring the degree of movement necessary for adjusting said first variable orifice after a load is applied to said second orifice, so as to restore the pressure at said reference point to the value before said load was effective.

6. A weighing device comprising a constant air pressure source, a first variable orifice adjustable corresponding and in relation to forces applied thereto, conduit means for connecting said first orifice to said source, a second, similar variable orifice, conduit means for connecting said second orifice in series to said first orifice, there being a pressure reference point at the junction of said series-connection of said orifices, a pressure gauge connected to said reference point, means for applying an adjustable force to said first orifice for throttling thereof, means including a gear train for adjusting the amount of opening of said first variable orifice, and a tally counter connected with the input side of said gear train for measuring the degree of movement necessary for adjusting said first variable orifice after a load has been applied to said second orifice so as to restore the pressure at said reference point to the value before said load was effective, said tally counter being calibrated to the load capacity of said second orifice so that the load thereon may be read correctly.

7. A weighing device comprising a source of air under pressure with a constant pressure regulator connected thereto, a first variable orifice adjustable corresponding and in relation to forces applied thereto, conduit means for connecting said first orifice to said regulator, a second, similar variable orifice conduit means for connecting said second orifice in series to said first orifice, there being a pressure reference point at the junction of said series-connection of said orifices, a pressure gauge connected to said reference point, means for applying an adjustable force to said first orifice for throttling thereof, means including a gear train for adjusting the amount of opening of said first adjustable variable orifice, a tally counter connected with the input side of said gear train for measuring the degree of movement necessary for adjusting said first variable orifice after a load has been applied to said second orifice so as to restore the pressure at said reference point to the value before said load was effective, and rough and fine adjustment means drivingly connected to the input side of said gear train for adjusting the opening of said first adjustable variable orifice.

References Cited in the file of this patent

UNITED STATES PATENTS

| | | |
|---|---|---|
| 2,357,272 | Tate | Aug. 29, 1944 |
| 2,390,252 | Hayward | Dec. 4, 1945 |
| 2,589,251 | Heinz | Mar. 18, 1952 |
| 2,592,569 | Henderson | Apr. 15, 1952 |

FOREIGN PATENTS

| | | |
|---|---|---|
| 388,265 | Great Britain | Feb. 23, 1933 |